UNITED STATES PATENT OFFICE.

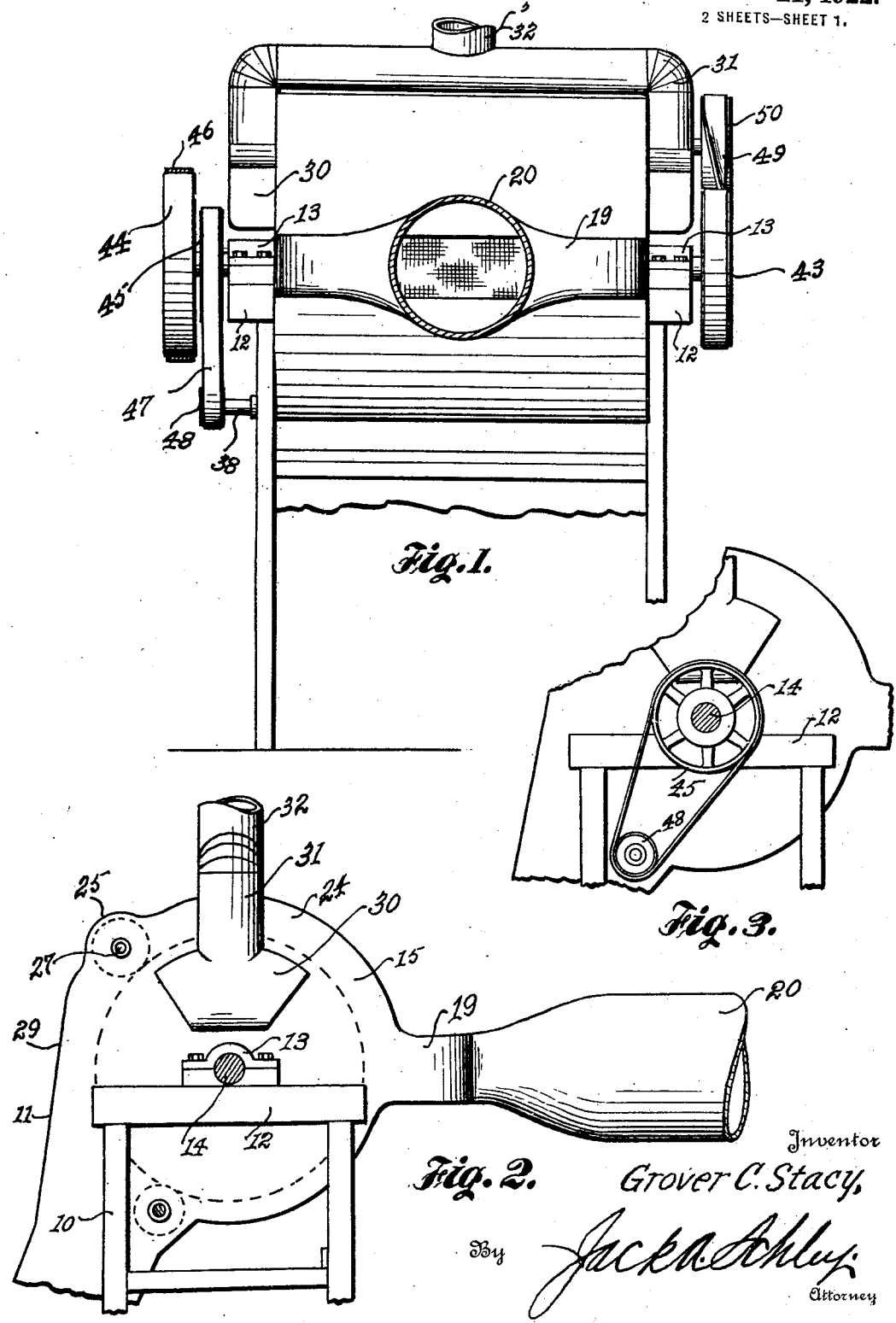

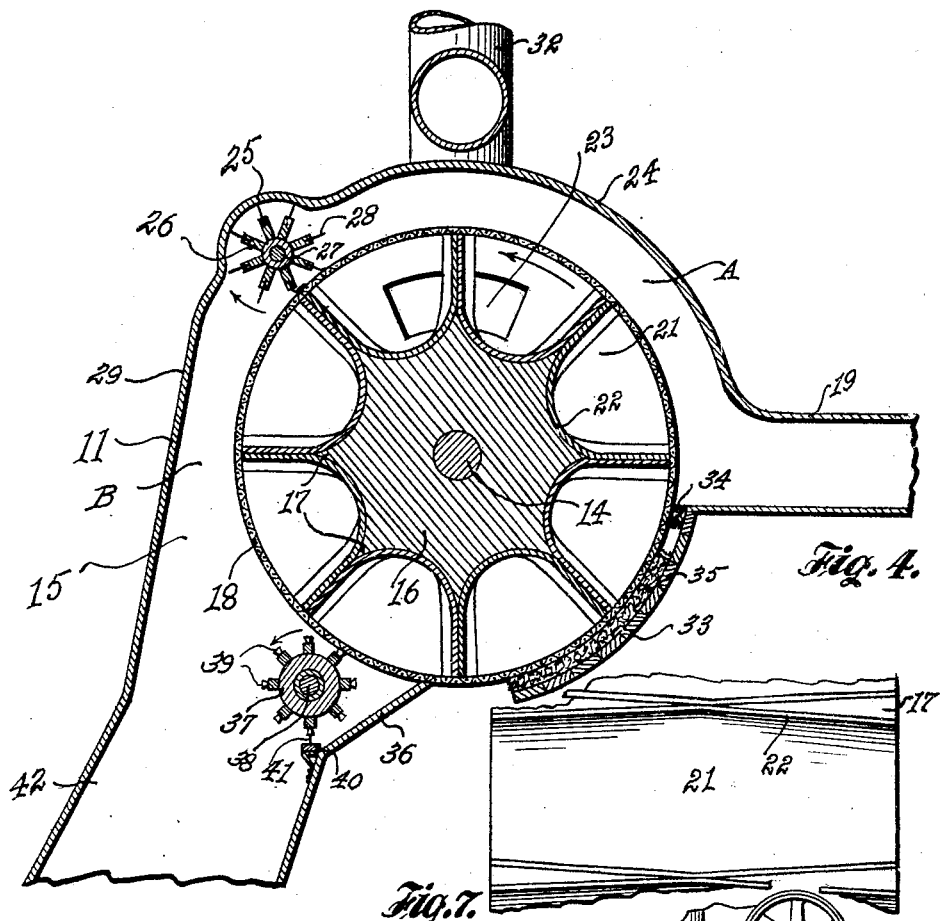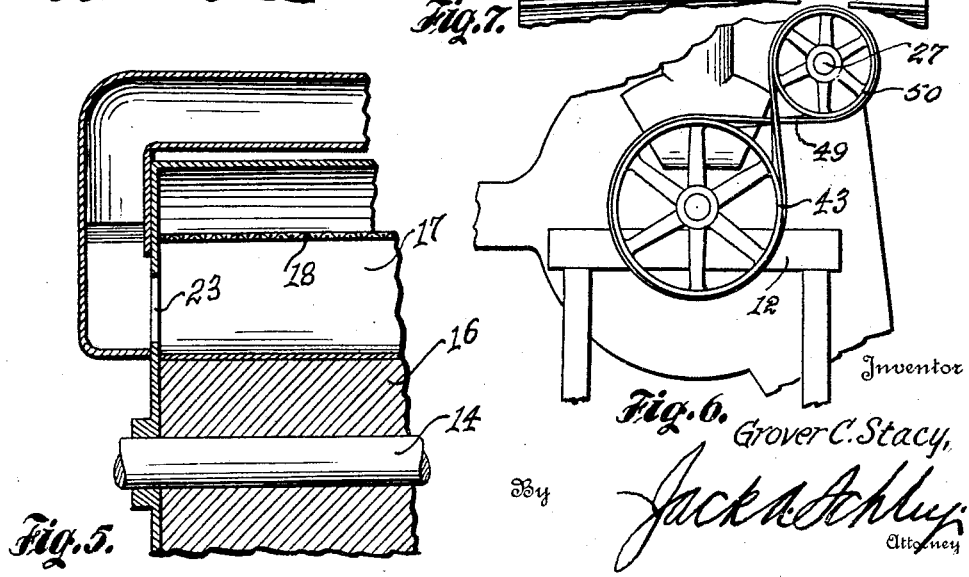

GROVER C. STACY, OF DALLAS, TEXAS.

COTTON SEPARATOR.

1,410,038.　　　　Specification of Letters Patent.　　Patented Mar. 21, 1922.

Application filed August 2, 1920. Serial No. 400,655.

*To all whom it may concern:*

Be it known that I, GROVER C. STACY, a citizen of the United States, residing at Dallas, in the county of Dallas and State of Texas, have invented certain new and useful Improvements in Cotton Separators, of which the following is a specification.

This invention relates to new and useful improvements in cotton separators.

It is customary to draw cotton through a pipe or other conveyer, by means of an air suction, in removing said cotton from the farmers wagons or a storage bin. The cotton so conveyed is discharged onto a distributing belt by which it is conveyed to the cleaning and ginning machinery. It has been necessary to operate the distributing belt in an air tight box to prevent a back draft which would interfere with the discharge of the cotton. It has been customary to separate the air and cotton at the point of discharge, but so far as I am able to learn no means has been devised which has proven entirely satisfactory. There has been a tendency in most of the devices toward the choking of the cotton at the point of discharge, which impeded the operation and caused an interruption in order that the congestions might be relieved.

Considerable trouble has been experienced in keeping the distributor belt box and other parts free from air leaks, which interferred with the suction and caused loss of time as well as expensive handling of the cotton.

The purpose of my invention is to provide an air and cotton separator which will overcome these objections, and which will permit the use of a distributor belt irrespective of whether its box keeps air or not. The invention seeks to separate the cotton and air current by permitting the air current to freely pass from the separator immediately before the discharge of the cotton onto the distributor belt, and to uniformly discharge the cotton whereby the separator cannot possibly choke up and also by which the cotton is more efficiently handled. It is further proposed to exhaust or discharge the air current from the separator in such a manner as not to disturb the cotton by permitting its exit at more than one point in the separator.

Another aim of the invention is to discharge the cotton more evenly and to prevent the accumulation of the same on the separating drum as well as any retroactive action whereby the cotton would be carried back and into the air flue.

In carrying out the invention I provide a housing or casing divided into a separating chamber and a cotton discharge chamber. A foraminous cylinder or drum is mounted in the casing and means is provided for contacting with the surface of the drum to separate the two chambers, and means is also provided for preventing the passage of air between the chambers. The separating chamber of the casing has an inlet through which the cotton and air current enter. Means for exhausting the air current from the separating chamber without removing the cotton is provided by confining the air outlet within the diameter of the cylinder. A revolving gate is provided between the separating chamber and the discharge chamber for permitting the passage of cotton from the separating chamber to the discharge chamber, but preventing a retroactive passage of either the cotton or air current. Means is provided in the discharge chamber for wiping the face of the cylinder so as to remove any cotton which might adhere thereto and pass back into the separating chamber. By removing the air current at more than one point the cotton will be spread over the surface of the cylinder and thereby more uniformly discharged; also the wiper will tend to assist in this discharge and will also keep the face of the cylinder free. The cotton entering the discharge chamber will not be affected by air currents and will fall freely from the cylinder. A particular feature of the invention is the formation of air pockets within the cylinder below its surface, these serving to pocket the air current received from the separating chamber and discharge the same into the air outlets which are preferably located at each end of the cylinder. This arrangement precludes the passage of air current into the discharge chamber.

The invention will be more readily understood from a reading of the following specification and by reference to the accompanying drawings, in which an example of the invention is shown, and wherein:

Fig. 1 is a front elevation of a separator constructed in accordance with my invention, Fig. 2 is a side elevation of the same, with the belt drive omitted, Fig. 3 is a partial elevation of the same showing the belt drive in plane, Fig. 4 is a longitudinal vertical sectional view, Fig. 5 is a partial transverse sectional view, Fig. 6 is an elevation of the opposite side from that shown in Fig. 3, and Fig. 7 is a partial plan view of the cylinder with the screen omitted.

In the drawings the numeral 10 designates a supporting frame on which a casing or housing 11 is suitably mounted. The supporting frame includes horizontal sills 12 at each side which support bearing boxes 13. A transverse shaft 14 extends through the casing and is supported in said bearing boxes. The casing is provided with vertical sides 15 fastened to the inner sides of the frame and sills. This casing may be formed of suitable materials.

On the shaft 15 is mounted a solid cylinder 16 which is provided with radial arms 17. The arms support on their outer ends a cylindrical screen or foraminous member 18 which extends from one side 15 to the other side 15 of the casing. At the front central portion of the casing a flaring air nozzle 19 is attached. This nozzle flares from a cylindrical feed pipe 20, centrally located, to each side of the casing. The pipe 20 extends to the point where the cotton is received, which may be either the farmers wagon or a storage bin. A suction of air is created as hereinafter described, which causes the cotton to be drawn through the pipe 20 and into the nozzle 19, in which latter it is spread and delivered to the cylinder 18. By reason of the flaring nozzle the cotton will be distributed across the cylinder.

In order to obtain an even distribution of the cotton on the cylinder, pockets 21 are formed between the arms 17 of the cylinder. These pockets are lined with sheet metal troughs 22. It will be noted that each trough is widest at its center and converges toward each end of the cylinder, longitudinally of said cylinder. This construction has a particular function in that a greater volume of air will be pocketed at the center of the drum or cylinder than at its ends. At the center of the casing air outlets 23 are provided above the shaft 14, one in each wall 15 within the diameter of the cylinder 18. Each outlet 23 is located so that the pockets will register and be carried over the same. The air current will be deflected toward each end of the cylinder and will escape through the outlets 23 and owing to the greater volume at the center and the lesser volumes at the ends, the cotton will be more evenly distributed over the surface of the screen 18 and will not be carried in greater quantities toward the ends of said cylinder.

The casing has an arcuate roof 24 spaced above the cylinder and extending from the nozzle 19. Between the cylinder and the roof 24, an air current and cotton separating chamber A is provided. At the rear of the roof a transverse hip 25 is provided and a cylindrical gate 26 is mounted on a shaft 27 under this hip. The gate comprises a plurality of radial ribs having flexible strips 28 along their outer edges which are preferably made of rubber fabric, but may be of any suitable material. The parts are arranged so that the strips will contact with the surface of the cylinder 18, and pass in close contact with the underside of the hip 25. The casing has a downwardly and outwardly inclined rear wall 29 extending from the hip and between this wall and the cylinder 18, a cotton discharge chamber B is formed. It will be seen that the gate 26 separates the chambers A and B, and acting in connection with the pockets 21 prevents the passage of the air current between the chambers, but allows the cotton to pass from the chamber A to the chamber B. This is one of the very important features of the invention as it permits the cotton to freely discharge and also provides a free escape for the air current. The prime feature of the invention, however, is the even distribution of the cotton over the cylinder 18 and its passage into the discharge chamber B whereby clogging or choking is obviated. It will be seen that it makes no difference whether the chamber B or the pipes below the same are air tight or not, as the air current from the pipe 20 would escape freely through the outlets 23 and the cotton will fall by gravity from the cylinder 18 in the chamber B.

A hood 30 covers each outlet 23 on the outside of each wall 15. From each hood an angular branch pipe 31 extends upwardly and over the roof 24 to a central suction pipe 32 which is connected with suitable means, not shown, for creating a suction of air. By this arrangement an air suction is created in the pipe 20 and the cotton drawn into the separator. It is pointed out here that by exhausting the air current at each end of the casing accounts largely for the success of this separator. It has been a practice in many separators to exhaust the air current from one side only and this was found to cause the separator to choke up.

The cotton and air current must not pass downward from the nozzle 19, therefore, a transverse bottom 33 in concentric relation to the cylinder 18 is provided, and extends downwardly from said nozzle. At the point where the nozzle joins the bottom 33 a packing strip 34 is transversely mounted and may have a facing of fibrous material bearing against the cylinder 18 so as to prevent the passage of air current or material downwardly. The bottom 33 is also faced with fibrous material 35 engaging the surface of the cylinder, and acting as a packing. The bottom 33 terminates a short distance from an inclined backboard 36, the cylinder being exposed between said parts.

A brush 37 is mounted on a shaft 38 just in rear of the backboard 36 and at the bottom of the chamber B. The brush is provided with radial bristles 39 and is somewhat similar to an ordinary gin brush. The brush is arranged under the cylinder 18 so that its bristles will wipe the face of said cylinder as the parts revolve. A combing strip 40 is mounted under the brush and is provided with upstanding points 41 which are engaged by the bristles 39 as the brush revolves; this arrangement being for the cleaning of said brush. By observing Fig. 4, it will be seen that the screen or cylinder revolves rearwardly in the direction of the arrow, and the gate 26 revolves away from the cylinder so as to tend to carry the cotton into the chamber B. The brush 37 revolves in an opposite direction from the cylinder so as to wipe the face of the cylinder and throw the cotton rearwardly into the chamber B. A downwardly flaring hopper 42 extends from the chamber B and distributes the cotton on the distributing belt (not shown). It will be noted that the chamber B and the hopper 42 flare downwardly so that the cotton cannot become choked and a free discharge will be had.

Both ends of the shaft 14 extend beyond the bearing boxes 13. A pulley 43 is mounted on one end of said shaft while pulleys 44 and 45 are mounted on the other end of the shaft. The pulley 44 is driven by a belt 46 from a suitable source of energy, whereby the cylinder is revolved. A belt 47 has one end supported on the pulley 45 and the other end passing around a pulley 48 on the end of the brush-shaft 38. The pulley 43 supports one end of a crossed belt 49 which has its opposite ends passing about a pulley 50 on the end of the gate shaft 27, whereby said gate is driven in a direction opposite to that in which the brush is revolved.

It will be seen that the cotton is drawn in through the pipe 20 and distributed by the nozzle 19 over the cylindrical screen 18. The pockets 21 having a greater area under the surface of the screen at the center of the cylinder, will accommodate a greater volume of air and thus the cotton will be prevented from crowding toward each side or end of the cylinder as the air current is exhausted through the outlets 23. The air current being exhausted in two directions tends to spread the cotton and prevents choking. By the time the cotton is carried to the gate 26, the air current has been separated and the cotton will readily pass between the gate and the cylinder and fall in the chamber B. Owing to its even distribution the cotton cannot choke in the chamber B, and will be readily discharged. Any cotton which might tend to adhere to the screen will be wiped off by the brush 37 and discharged into the hopper 42. It will be seen that any air current which leaks below the chamber B, will have no effect on the apparatus because the air current from the pipe 20 will exhaust freely through the outlets 23, and the pockets and gate will prevent the suction of air in a reverse direction. This device will save considerable time and will leave the cotton in a much better shape.

What I claim, is:

1. In a cotton separator, a casing having a cotton admitting opening at one side and a cotton discharge opening at the opposite side, a revolving cylinder mounted in the casing between said openings, said cylinder having radial arms forming pockets extending longitudinally thereof, a screen member surrounding the cylinder and supported by the radial arms and covering said pockets, means for exhausting air currents from the pockets at the opposite ends of the cylinder, and a rotatable gate arranged within the casing and having radial ribs carrying flexible elements to contact with the screen member, said gate being arranged between said openings and co-acting with the radial arms of the cylinder for forming an air seal.

2. In a cotton separator, a casing having a cotton admitting opening at one side and a cotton discharge opening at the opposite side, said casing having exhaust openings in its ends, exhaust means in communication with the exhaust openings, a revolving cylinder mounted in the casing between the cotton admitting and discharge openings, said cylinder having radial arms forming pockets therebetween, a screen member surrounding the cylinder and supported by the radial arms and covering said pockets, said pockets extending longitudinally of the cylinder with their ends open to communicate with said exhaust openings, and a rotatable gate arranged within the casing between the cotton admitting and discharge openings and co-acting with the radial arms of the cylinder to form an air seal.

3. In a cotton separator, a casing having a cotton admitting opening at one side and a cotton discharge opening at the opposite side, said casing having exhaust openings in its ends, a cylinder mounted to rotate in the casing between the cotton admitting and discharge openings, said casing having radial arms forming pockets extending longitudinally of the cylinder, said pockets converging toward their opposite ends which are opened and adapted to communicate with said exhaust openings, a screen member surrounding the cylinder and supported by the radial arms and covering the pockets, means for exhausting air through said exhaust openings, and a rotatable gate arranged within the casing between the cotton admitting and discharge openings and cooperating with the radial arms to form an air seal.

4. In a cotton separator, a casing having a cotton admitting opening, a foraminous cylinder revolving in the casing, means for exhausting air current from the chamber located within the diameter of the cylinder, and a revolving gate disposed between the casing and the cylinder and contacting therewith, the casing having a cotton discharge and the gate being located between the air current exhausting means and the cotton discharge.

5. In a cotton separator, a casing having a cotton admitting opening, a foraminous cylinder revolving in the casing, means for exhausting air current from the chamber located within the diameter of the cylinder, a revolving gate disposed between the casing and the cylinder and contacting therewith, the casing having a cotton discharge and the gate being located between the air current exhausting means and the cotton discharge, and a revolving wiping device engaging the cylinder for discharging cotton therefrom.

6. In a cotton separator, a casing, a cotton admitting nozzle connected with one side of the casing, a cylinder mounted to revolve in the casing and having longitudinal pockets, a screen covering the pockets and forming the surface of the cylinder, air current outlets at each end of the cylinder communicating with its pockets, means for creating a suction of air through said outlets, a revolving gate mounted in the casing and engaging with the screen surface of the cylinder, a revolving brush mounted in the casing and engaging between the surface of the cylinder, a discharge hopper at the rear of the casing, and a packing between the casing and the cylinder screen below the nozzle.

In testimony whereof I affix my signature.

GROVER C. STACY.